United States Patent [19]

Luitwieler, Jr. et al.

[11] 3,860,823

[45] Jan. 14, 1975

[54] GAMMA RAY SPECTROMETER DISPLAY MEANS

[75] Inventors: Samuel H. Luitwieler, Jr., La Habra; Paul R. Klein, Laguna Niguel, both of Calif.

[73] Assignee: Beckman Instruments, Inc., Fullerton, Calif.

[22] Filed: Mar. 26, 1973

[21] Appl. No.: 344,740

[52] U.S. Cl. .............................. 250/369, 250/363
[51] Int. Cl. ............................................. G01t 1/20
[58] Field of Search ............ 250/328, 361, 363, 366, 250/369

[56] References Cited
UNITED STATES PATENTS

| | | | |
|---|---|---|---|
| 3,271,574 | 9/1966 | Dawson et al. | 250/328 |
| 3,479,455 | 11/1969 | Gebel | 250/363 X |
| 3,491,239 | 1/1970 | Dalman | 250/363 X |
| 3,549,887 | 12/1970 | Hansen | 250/369 |
| 3,573,458 | 4/1971 | Anger | 250/369 X |

Primary Examiner—Archie R. Borchelt
Attorney, Agent, or Firm—R. J. Steinmeyer; J. G. Mesaros

[57] ABSTRACT

A gamma ray spectrometer having a plurality of presettable channels, a given channel being selectable for displaying on a cathode ray tube a trace proportional to the energy of the gamma ray of a given sample and the intensity of the given energy event. The cathode ray tube is originally biased so that the beam is below the face of the tube and therefore not displayed. A sweep gate signal for the cathode ray tube is driven by the selected channel for deflecting the beam onto the face of the tube and for selectively blanking and unblanking the cathode ray tube in response to the sweep gate signal for displaying on the cathode ray tube only that trace indicative of the selected channel, the height of the trace on the tube being indicative of the energy while the intensity of the trace so displayed is proportional to the count rate.

12 Claims, 4 Drawing Figures

GAMMA RAY SPECTROMETER DISPLAY MEANS

BACKGROUND OF THE INVENTION

This invention relates to radiation source measuring and display apparatus, and more particularly to a gamma ray spectrometer having display means.

In order to measure the radioactivity of a radiation source, and particularly to measure the gamma ray activity of a radiation source, multi-channel analyzers have been developed to obtain gamma ray spectra to depict a graph showing on a vertical scale the height of the counts per unit of energy with the horizontal scale being proportional to the energy of the event. The detectors in gamma ray spectrometers utilize scintillator crystals such as NaI (Tl) crystals, such that when gamma rays interact with the atoms of the crystal, the crystal emits visible light which is proportional intensity to the energy deposited by the gamma rays in the crystal. A photomultiplier, optically coupled to the crystal, produces a voltage pulse proportional in magnitude to the light striking the photo cathode. In multi-channel analyzers, the resultant voltage pulse is then amplified and stored, for example, in a ferrite core memory, with the channels of the analyzer corresponding to energy intervals of the gamma ray spectrum. The number of pulses counted and stored in the various channels is, therefore, a function of the characteristic gamma ray spectrum of the radioactive materials being counted.

Such multi-channel analyzers, in addition to the requirement for storage, requires certain signal processing, such as by a computer to derive the required spectrum display output. Such a system is shown and described in U.S. Pat. No. 3,101,409 issued on Aug. 20, 1963 to Lloyd E. Fite.

SUMMARY OF THE INVENTION

Accordingly, it is an object of this invention to provide a new and improved gamma ray spectrometer.

It is another object of this invention to provide a gamma ray spectrometer having display means.

It is a further object of this invention to provide a gamma ray spectrometer having means for displaying a trace on a cathode ray tube where the intensity of the beam so displayed is proportional to the count rate and the height of the pulse so displayed is proportional to the radiation energy.

It is still another object of this invention to provide a gamma ray spectrometer having multiple signal channels, any one of which can be selected for displaying a trace indicative of the gamma ray spectrum of the radioactive material being counted.

The foregoing and other objects of the invention are accomplished by providing a gamma ray spectrometer having a plurality of presettable signal channels for passage through a particular channel of pulses that are within a selected "window" above a lower threshold and below an upper threshold. A particular channel is selectable for display on a cathode ray tube to provide a trace where the trace height is proportional to the energy event and the intensity (the brightness of the trace on the display screen) is proportional to the count rate. The detector output is amplified and transmitted to the vertical deflection plates of the cathode ray tube while the output of the selected channel provides a sweep gate signal for blanking and unblanking the cathode ray tube in response thereto. The beam of the cathode ray tube is initially biased below the display screen so that in the absence of a sweep gate signal there is no dot on the face of the display screen.

Other objects, features and advantages of the invention will become apparent from the following specification when taken in conjunction with the accompanying drawings.

DESCRIPTION OF THE PREFERRED EMBODIMENT

Figure 1:
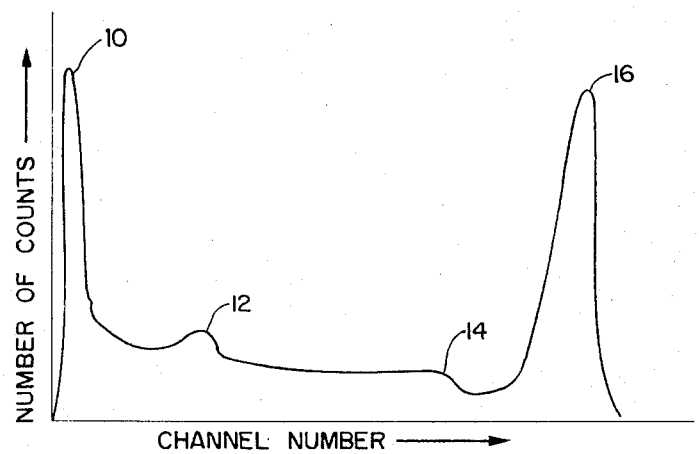
FIG. 1 is a graphical representation of a gamma ray spectrum obtainable by utilization of a prior art multi-channel analyzer.

Referring now to the drawings and particularly to FIG. 1, there is shown a graph representing the gamma ray spectrum obtainable from a multi-channel analyzer for a $^{137}C_S$-$^{137m}B_A$ source where the vertical coordinate represents the number of counts and the horizontal coordinate represents the channel number. Portions of the spectrum have been designated with reference numerals to indicate information of interest, and for example the pulse peak designated 10 indicates 32 KeV of BaK x-ray, the portion designated 12 indicates 184 KeV of back scatter, the portion designated 14 indicates 478 KeV Compton edge and the pulse peak designated 16 represents a 662 KeV photo peak. The spectrum is derived by means of a plurality of channels, for example, a 256 channel analyzer is often employed, wherein data pulses are stored in a memory and then processed in order to provide the display shown in FIG. 1.

Figure 2:
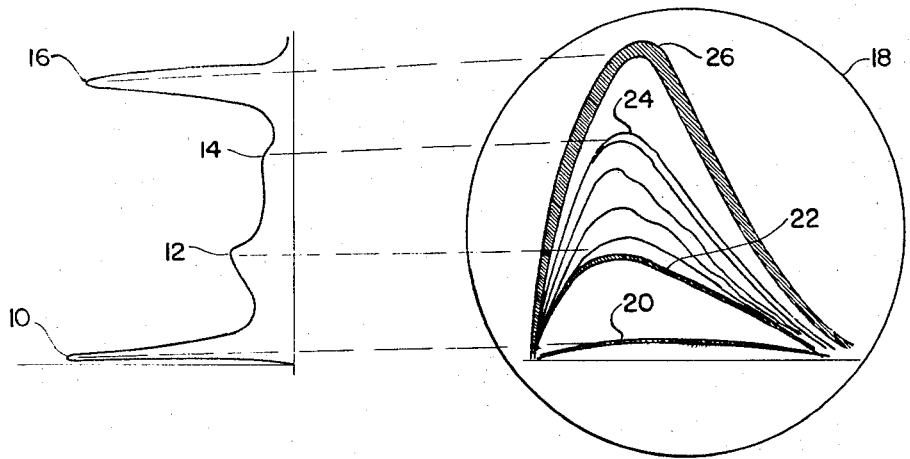
FIG. 2 shows graphically the spectrum of FIG. 1 rotated 90° correlated to the output of the display means of the subject invention; means in accordance with the invention, illustrating energy pulses at predetermined locations.

In accordance with the invention a display screen is provided to generate a spectrum as illustrated within the circle 18 of FIG. 2 with a spectrum of FIG. 1 rotated 90° and lines drawn between the two spectra to illustrate the one-to-one correspondence of information obtainable by utilization of a gamma ray spectrometer in accordance with the invention. The spectrum illustrated within the display screen or circle 18 shows the entire energy spectrum when discriminator settings for the signal channels cover the entire spectrum. Certain traces are shown in bolder lines, with the bolder lines indicating a brighter or more intense trace of the display screen which intensity is proportional to the number of counts. The height of the pulse on the display 18 is indicative of the energy of the event. For example, the brighter traces on the display 18 are trace 20 and trace 26 corresponding to the previously discussed peaks 10 and 16, respectively which illustrate a high number of counts. The back scatter previously discussed with respect to portion 12 of the curve corresponds to a trace 22 of lesser intensity by virtue of the fewer number of counts, while portion 14 of the multi-channel analyzer spectrum corresponds to trace 24 on the display 18. Thus, as will hereinafter be discussed, the information obtainable from a multi-channel analyzer can be obtained in a much simpler manner by the utilization of the eye to determine the relative count rate by virtue of the intensity of the display trace.

Figure 3:
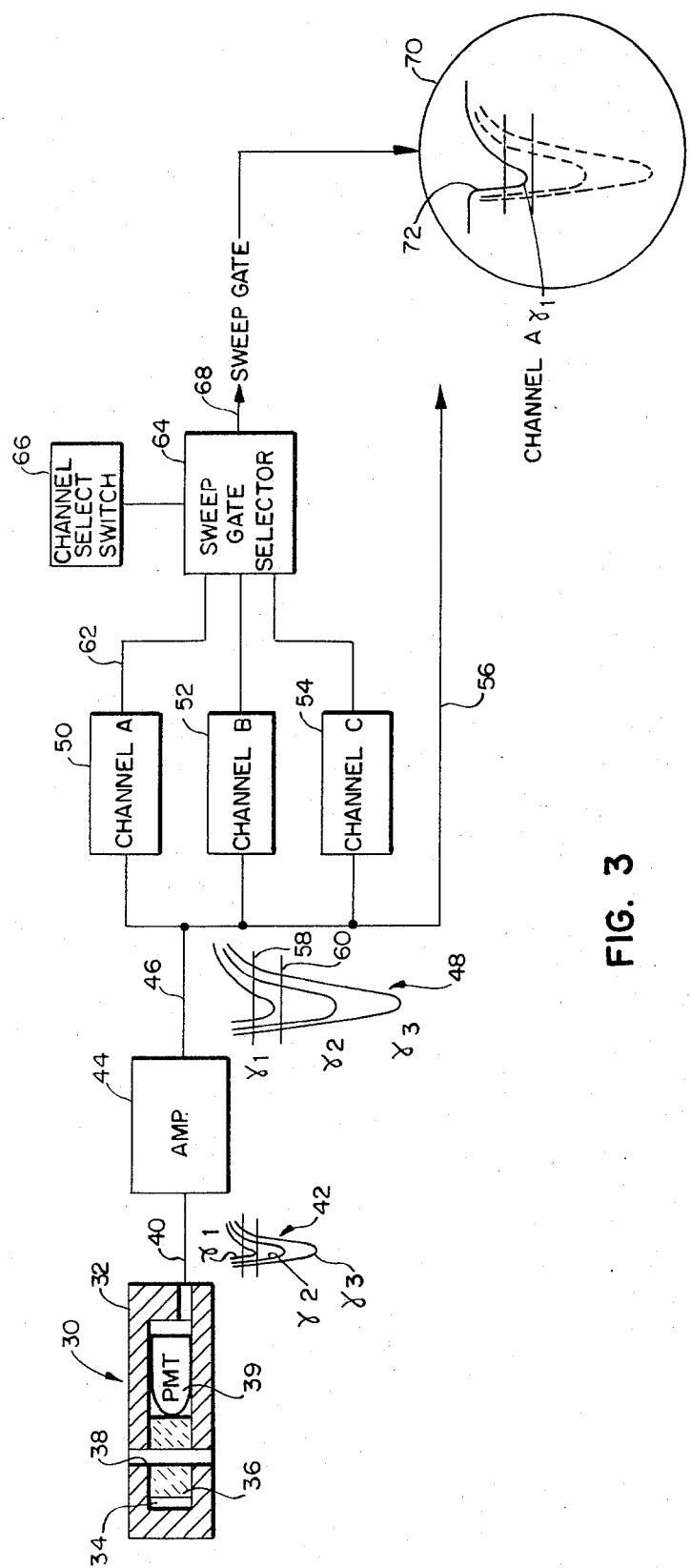

Referring now to FIG. 3, there is shown a detector 30 having a housing 32 having an opening 34 therein containing a scintillator crystal of NaI (T1) 36. A vertical opening 38 is provided extending through the housing 32 and the crystal 36 into which is inserted a radiation source, the characteristics of which are desired to be analyzed. Optically coupled to the crystal 36 is a photomultiplier tube 39 which provides an output on lead 40, which output is graphically illustrated by the family of curves 42. The family of curves 42 is an inverted graph of that depicted on the display 18 of FIG. 2 with three primary traces being depicted, with the traces being designated $\gamma_1$, $\gamma_2$ and $\gamma_3$, each having a different pulse height. This output from the photomultiplier tube 39 is transmitted over lead 40 amplifier 44 to appear at the output on lead 46, the output waveforms being illustrated by the family of curves 48 which is an enlargement or amplified version of the family of curves 42. This output is transmitted simultaneously to three channels designated channel A within block 50, channel B within block 52 and channel C within block 54, with the output on lead 46 also being transmitted by means of lead 56 to the "vertical" input of the circuitry shown in FIG. 4. Each of the channels 50, 52 and 54 are provided with discriminator settings to provide a lower and upper threshold for passage therethrough of pulses within the selected threshold limits. For example, the family of curves 48 is provided with two horizontal lines designated 58 and 60, line 58 depicting the lower threshold discriminator setting with line 60 depicting the upper threshold discriminator setting for channel A, for example. As mentioned, these discriminator settings for channel A will pass therethrough on output lead 62 to the sweep gate selector 64 only the signal from the photomultiplier tube 39 which lies between the lower threshold level 58 and the upper threshold level 60. The sweep gate selector 64 is provided with a channel select switch 66 to select a particular channel for outputting through sweep gate selector 64 to the "sweep gate" output 68. The example hereinabove given is based on the assumption that the channel select switch 66 is set to provide an output from channel A only through sweep gate selector 64. By this selection the sweep gate output on lead 68 is depicted within the circle 70 wherein the solid line curve 72 depicts the channel A output, that is trace $\gamma_1$ from the family of curves 48. The dotted line traces within the circle 70 designate the other two traces of the family of curves 48 which can pass through channels B and C, respectively, provided the discriminator settings are so set.

Figure 4:
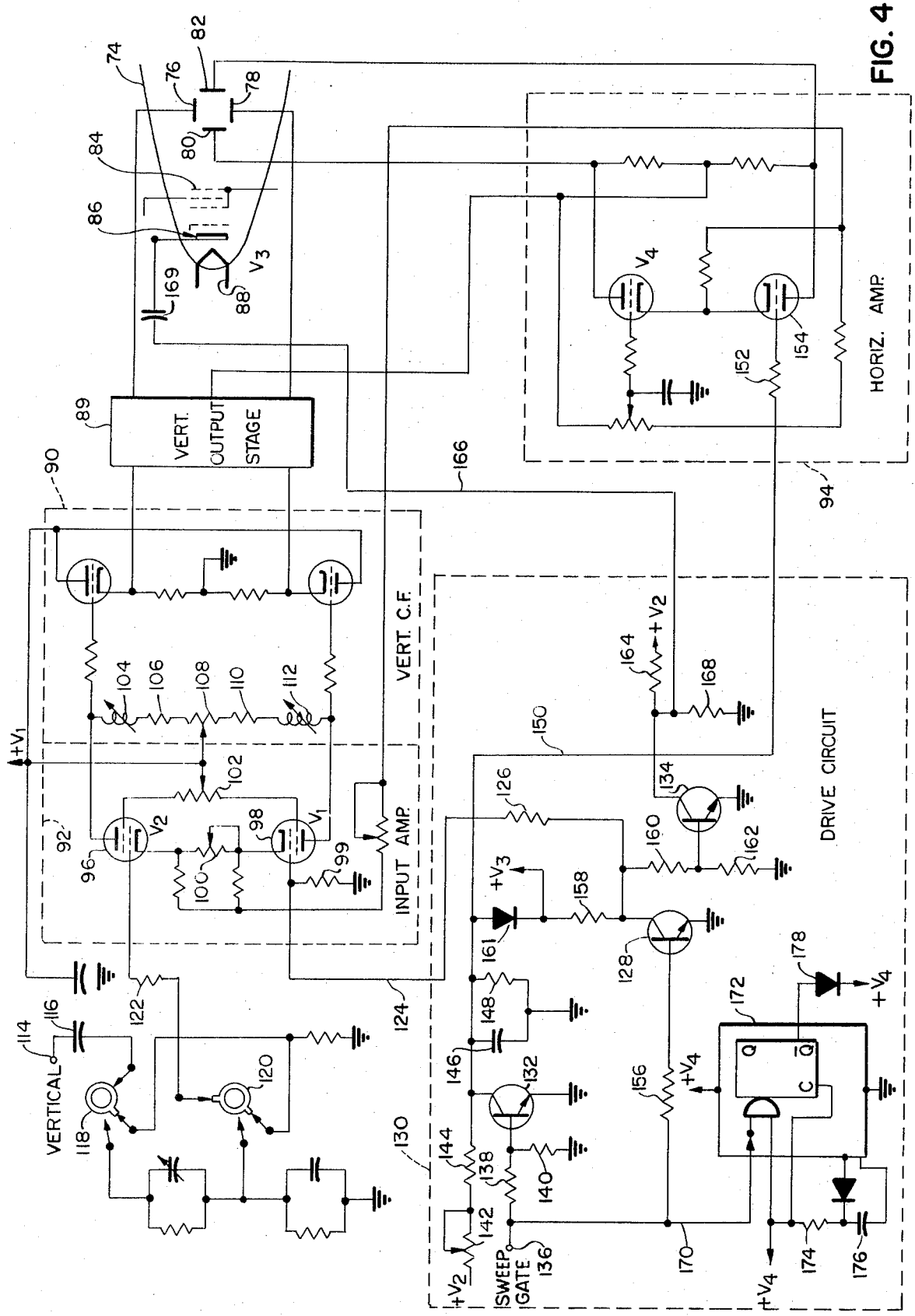
FIG. 4 is a partially schematic and partially block diagram of the display means and driving circuitry in accordance with the invention.

Referring now to FIG. 4, there is shown a schematic representation of the display means and driving circuitry therefor in accordance with the invention. The display is, for example, a cathode ray tube 74 having vertical deflection plates 76 and 78 and horizontal deflection plates 80 and 82. The power supply and biasing means for the grids 84, the anode 86, and the filament 88 have been omitted so as not to unduly complicate the Figure. Furthermore, the vertical output stage 89 is shown in block diagram form with the vertical cathode follower stage 90 enclosed in dotted lines, the input amplifier 92 is shown in dotted lines along with the horizontal amplifier 94. The elements thus far described are portions of a conventional oscillopscope modified as will hereinafter be described by the addition of driving circuitry to interface with the output of the circuitry shown in FIG. 3. A detailed description of the operation of the oscilloscope portion of the circuitry will be omitted and only those portions of the circuit will be discussed which are necessary to an understanding of the invention. The input amplifier stage of a conventional oscilloscope includes first and second pentodes 96 and 98 having the cathodes thereof interconnected by means of a potentiometer 100 for adjustment of the vertical gain, while the second grids thereof are interconnected through a potentiometer 102. The plate of tube 96 is connected through inductor 104 through resistor 106 through potentiometer 108 through resistor 110 through inductor 112 to the plate of tube 98. Potentiometer 108 is an adjustment for vertical beam positioning, and is originally adjusted to bias the beam down and to the left of the display screen of the cathode ray tube 74. The vertical input signal derived from lead 56 in FIG. 3 is applied to the vertical input terminal 114 through capacitor 116 through switch 118 through second switch 120 through resistor 122 to the control grid of tube 96. Switches 118 and 120 provide "high" and "low" settings but only one setting need be discussed. The control grid of tube 98 is coupled by means of lead 124 through resistor 126 to the collector of transistor 128 which is a part of the drive circuit 130 (shown in dotted lines).

The drive circuit 130 includes NPN transistors 128, 132 and 134. The "sweep gate" signal derived from output lead 68 (FIG. 3) of sweep gate selector 64 is applied d to sweep gate input terminal 136 which is coupled through resistor 138 to the base of transistor 132, the emitter thereof being grounded in a common emitter configuration with a resistor 140 connected between the base and the emitter. The collector of transistor 132 is coupled to a positive voltage source $+V_2$ through an adjustable resistor 142 and a current limiting resistor 144. In parallel with the collector to emitter of transistor 132 is a parallel RC circuit including capacitor 146 and resistor 148. The collector of transistor 132 is further connected by means of lead 150 through resistor 152 to the grid of tube 154 of the horizontal amplifier stage 94.

Transistor 128 has the base thereof coupled through resistor 156 to the sweep gate input terminal 136, while the emitter is coupled to ground and the collector is coupled to a positive source of voltage $+V_3$ through a current limiting resistor 158. A clamping diode 161 has the anode thereof coupled to lead 150 and the cathode thereof coupled to the end of resistor 158 which is coupled to the voltage source $+V_3$. The collector of transistor 128 is connected through voltage divider series resistors 160 and 162 to ground while the junction intermediate resistors 160 and 162 is coupled to the base of transistor 134 which has the emitter thereof connected to ground. The collector of transistor 134 is connected through a current limiting resistor 164 to a positive source of voltage $+V_2$ while the collector is also connected by means of lead 166 through capacitor 169 to the cathode 86 of cathode ray tube 74. The collector of transistor 134 is also connected through resistor 168 to ground.

The sweep gate input terminal 136 is also coupled by means of lead 170 to a gatable one-shot multivibrator 172 which has a time constant determined by the RC network consisting of resistor 174 and capacitor 176.

The "Q̄" of multivibrator 172 is connected to the anode of a light emitting diode (LED) 178 while the cathode thereof is coupled to a positive voltage source +V₄ which is likewise used for biasing the multivibrator 172.

As previously mentioned, certain portions of the schematic of FIG. 4 are substantially similar to a conventional oscilloscope with the vertical input signal being applied through an input amplifier 92 through a vertical cathode follower stage 90 to a vertical output stage 89 to provide the signal to the vertical deflection plate 76 and 78. The horizontal amplifier 94 provides the necessary driving signals for the horizontal deflection plates 80 and 82. The blanking and unblanking of the cathode ray tube 74 is provided by the signal applied to the cathode of the cathode ray tube 74, the signal being derived from the drive circuit 130 as will now be discussed.

In the operation of the analyzer depicted as previously mentioned potentiometer 108 is adjusted to deflect the beam of the cathode ray tube 74 down and to the left of the display 18 (as viewed in FIG. 2).

In operation a positive signal applied to the vertical input terminal 114 and ultimately to the grid of tube 96 deflects the beam down while a positive signal applied to the grid of tube 98 of the input amplifier 124 will deflect the beam up. The latter signal is applied through transistor 128 through resistor 126 along lead 124 to the grid of tube 98. The unblanking of the cathode ray tube 74 is accomplished through transistor 134 controlling the cathode 86 through lead 166.

IN operation the sweep gate signal at the input terminal 136 is driven by the selected channel (channel A) in the analyzer. When a signal from the photomultiplier tube 38 crosses the lower threshold 58 the sweep gate signal goes from +4 volts to ground. If the upper threshold 60 is also crossed, the sweep gate signal is returned to +4 volts. The sweep gate signal drives transistors 132, 128 and tube 98. Transistor 132 is a sweep signal generator which is biased normally conductive so that when the sweep gate signal input at terminal 136 goes low transistor 132 is turned off and capacitor 146 is allowed to charge through resistors 142 and 144. The voltage appearing on capacitor 146 is direct coupled by means of lead 150 through resistor 152 to the grid of tube 154 of the horizontal amplifier stage 94 to thereby horizontally deflect the beam by means of the output of the horizontal amplifier stage 94 being applied to the horizontal deflection plates 80 and 82.

Transistor 128 is biased normally conductive while transistor 134 is normally nonconductive. With transistor 128 conductive the collector thereof is approximately at ground with a negligible amount of current flowing from the collector through the emitter thereof the grid of tube 98 of the input amplifier stage 92 is approximately at ground potential. With transistor 134 nonconductive the voltage on the cathode 86 is positive with respect to the grid 84 by virtue of the biasing means (not shown) coupled to cathode 86 and grid 84 of the cathode ray tube 74. When the sweep gate signal was applied to input terminal 136, in addition to transistor 132 permitting the charge of capacitor 146 to thereby drive the beam horizontally by virtue of horizontal amplifier 94, transistor 128 simultaneously becomes nonconductive while transistor 134 becomes conductive. As transistor 128 goes nonconductive the grid of tube 98 of input amplifier 92 goes positive in an amount determined by the current through resistor 99. A positive input signal to the grid of tube 98 deflects the beam (originally biased down below the face of the cathode ray tube 74) onto the face of the display screen. As transistor 134 becomes conductive, resistor 168 is effectively short circuited, thereby applying a negative going signal through capacitor 169 to the cathode 86 thereby driving the cathode negative with respect to the grid 84 to unblank the cathode ray tube 74. When the sweep gate signal goes positive, transistor 128 returns to its normally conductive condition while transistor 134 becomes nonconductive, thereby blanking the cathode ray tube and permitting the return sweep of the beam. The return sweep occurs below the face of the CRT as a result of the original bias.

With a higher pulse count rate the intensity of the waveform on the display screen of the cathode ray tube 74 increases since each trace is indicative of one pulse count. Accordingly, for the purpose of establishing the initial discriminator settings of the channels 50, 52 and 54, if the entire spectrum is displayed so as to present the family of waveforms shown in FIG. 2, the more intense waveforms would indicate the higher count rates, any of which can be selected by appropriate selection of the upper and lower threshold levels by adjustment of the discriminator settings, thereby permitting the display of only a selected waveform from the family of waveforms.

As seen in FIG. 4, the sweep gate signal appearing at input terminal 136 is also applied through lead 170 to a gateable one-shot multivibrator 172 which drives a light emitting diode 178. The light emitting diode 178 flashes each time a nuclear event occurs within the selected counting channel. This light gives a qualitative indication of the acitivity level for weak sources and saturates for strong where the display of the trace on the face of the cathode ray tube 74 becomes useful.

Consequently in accordance with the invention, since the detection of gamma rays in a NaI crystal gives pulses proportional to the Compton electron or photo electron energy of each gamma interaction in the crystal, much information can be gained by displaying the resulting spectrum as hereinabove described. The pulse amplitude is displayed on the vertical axis of the cathode ray tube and the time development of the pulse is on the horizontal axis thus providing a real time display. If the count rate is high enough, the eye and brain of the operator serve to integrate the visual display showing clear indications of the photo peaks, Compton edges and x-ray events of the various isotopes of interest. Furthermore, by the selection of certain "windows" or thresholds of interest, only pulses which have amplitudes within the "window" selected by the channel allow the display screen to be triggered. By the utilization of the channels, this permits rapid setting of the analyzer into any energy region desired, so that the cathode ray tube 74 displays only the traces within the so selected region. Furthermore, by having the beam originally biased below the display screen, and utilizing transistor 128 to deflect the beam onto the screen only when the sweep gate is triggered, the return trace of the cathode ray tube sweep occurs below the "zero energy" base line so that small pulses may be distinguished from the return trace.

While there has been shown and described a preferred embodiment, it is to be understood that various other adaptations and modifications may be made within the spirit and scope of the invention.

We claim:

1. In radiation source measuring apparatus, the combination comprising:

means for detecting the radiant energy emanating from a source;

display means including a cathode ray tube;

means coupled to said detector means for selecting a portion of the range of radiant energy emanating from said source;

means for biasing the beam of the cathode ray tube off the face of said tube;

means coupling said detecting means to said display means for driving the beam of said tube in a first direction; and means responsive to said selecting means for deflecting the beam onto the face of said tube, for unblanking said tube and for driving the beam in a second direction transverse to said first direction to display on said cathode ray tube a trace indicative of only the portion of the range of radiant energy selected by said selecting means.

2. The combination according to claim 1 wherein said means responsive to said selecting means includes a sweep signal generator operative only in response to the output of said selecting means.

3. The combination according to claim 2 wherein said selecting means includes a plurality of presettable discriminator signal channels and a sweep gate selector for selecting a particular signal channel for display, said sweep signal generator being driven in response to said sweep gate selector output.

4. The combination according to claim 3 wherein said source emanates gamma rays having varying amplitudes and pulse count rates, each of said signal channels is settable for passage therethrough of selected ones of said gamma rays, the trace on said cathode ray tube having an amplitude in said first direction proportional to the energy of the selected gamma ray, the trace having an intensity proportional to the count rate of said selected gamma ray.

5. In a gamma ray spectrometer apparatus, the combination comprising:

means for detecting the gamma ray energy events emanating from a source;

display means including a display screen having a first axis of display and a second axis of display transverse to said first axis;

means coupled to said detector means for selecting a portion of the gamma ray energy events emanating from the source;

first axis drive means coupling said detector means to said display means;

second axis drive means responsive to said selecting means; and means responsive to said first axis drive means and said second axis drive means for displaying on said display means a trace having an amplitude proportional to the energy of the selected portion and an intensity proportional to the frequency of occurrence of the energy events of the selected portion.

6. The combination according to claim 5 wherein said display screen is the face of a cathode ray tube.

7. The combination according to claim 6 further including means for biasing the beam of said cathode ray tube off the face of said tube and said first axis drive means is coupled to vertical deflection circuitry for said cathode ray tube.

8. The combination according to claim 7 wherein said selecting means provides a sweep gate signal, said second axis drive means is a horizontal deflection circuit operative in response to said sweep gate signal, and said biasing means biases the beam below and to the left of the face of said tube.

9. The combination according to claim 8 wherein said means responsive to said first and second axis drive means includes means operative in response to said sweep gate signal for opposing said biasing means to deflect the beam onto the face of said tube.

10. The combination according to claim 9 wherein said means responsive to said first and second axis drive means includes a cathode ray tube unblanking circuit operative in response to said sweep gate signal for unblanking said cathode ray tube for the time duration of said sweep gate signal.

11. In oscilloscopic apparatus for providing a trace on the face of a cathode ray tube of a selected one of a plurality of energy events, at least two of such energy events having different frequencies of occurrence, the combination comprising:

means for sensing the plurality of energy events;

discriminating means for selecting at least one of said plurality of energy events to provide an output signal proportional to the selected energy event;

means for biasing the beam of the cathode ray tube off the face of said tube;

means operatively coupling said sensing means to a first axis deflection circuitry; and means responsive to the output signal for unblanking said tube, for driving the beam along a second axis and for deflecting the beam onto the face of said tube in conjunction with said coupling means to display on said cathode ray tube a trace indicative of the selected energy event, said trace having an amplitude in said first axis direction proportional to the energy of said selected event and a beam intensity proportional to the frequency of occurrence of said selected event.

12. The combination according to claim 4 further including a gateable one-shot multivibrator operable in response to said sweep gate selector output and a light source coupled to the output of said multivibrator for being energized in response thereto.

* * * * *